Feb. 29, 1944.    G. A. TINNERMAN    2,342,910
FASTENING DEVICE
Filed Aug. 4, 1942

INVENTOR.
GEORGE A. TINNERMAN
BY
Bates, Teare, + McBean
ATTORNEYS

Patented Feb. 29, 1944

2,342,910

UNITED STATES PATENT OFFICE 2,342,910

FASTENING DEVICE

George A. Tinnerman, Cleveland, Ohio, assignor to Tinnerman Products, Inc., Cleveland, Ohio, a corporation of Ohio Application August 4, 1942, Serial No. 453,564

10 Claims. (Cl. 85—5)

This invention relates to fastening devices and particularly those which are adapted for making a connection between a rigid member and a layer of flexible material. One instance of such use is in retaining a valve in position upon the flexible material which comprises the body of a gas mask.

One of the problems encountered in the construction of a gas mask has been the difficulty of making a gas tight seal, and at the same time compensating for variations in the thickness of the rubberized fabric of which the body of the mask is made. The connection must be sufficiently tight to prevent the flexible material from being pulled away from the valve, and at the same time, must resist the infiltration of air when placed under a vacuum. Additionally, the connection must be adequate to permit quick assembly and to allow for variations in thickness of the flexible material within the range of tolerances encountered in the manufacture of the material in large scale production quantities.

An object of the present invention is to make a connecting device which will solve the aforesaid problem, which is capable of being readily assembled, and which has the ability to take-up automatically any change in the thickness of the flexible material resulting, for example, from the exertion of a continued pressure thereagainst by the fastening device. Additionally, the invention contemplates a fastening member which is relatively light in weight and which is capable of being economically manufactured, readily applied, and capable of being quickly replaced in the event of damage thereto during use.

Figure 1:
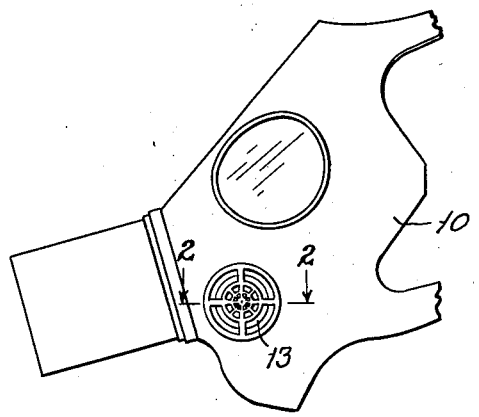
Figure 2:
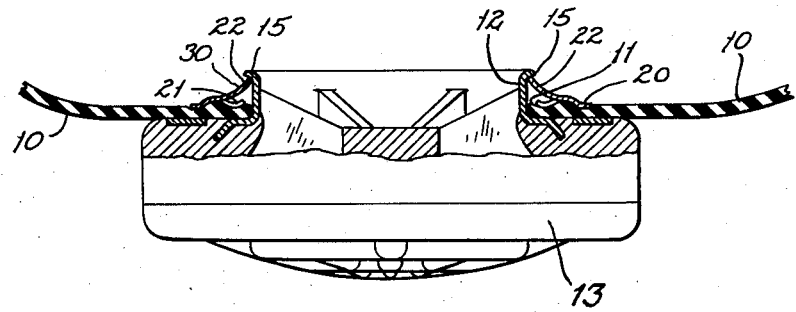
Figure 3:
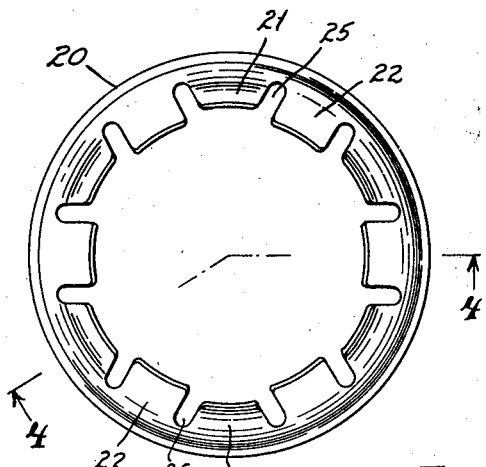
Figure 4:
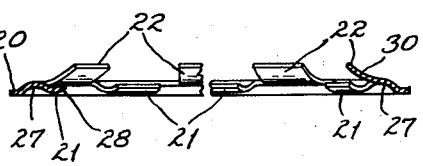

In the drawing, Fig. 1 is a side view of a gas mask embodying my invention; Fig. 2 is a section taken on a plane indicated by the line 2—2 in Fig. 1, but on a scale larger that that shown in Fig. 1; Fig. 3 is a top plan view of the fastener, and Fig. 4 is a section taken on a plane indicated by the line 4—4 in Fig. 3.

My invention is not limited in utility to any particular article. It is shown by way of example in the drawing as an appliance for connecting a valve to a gas mask, and in such illustration, the body of the mask is indicated at 10. Usually such body comprises rubberized fabric or gas impervious flexible material which is provided with an aperture 11 through which an extension 12 of a valve 13 projects. In one form of mask construction, the valve has a body of thermo-plastic material and the extension embodies a metallic stamping that is embedded within the valve body during the molding thereof.

To clamp the valve structure to the layer of flexible material, I provide a shoulder 15 on the extension, preferably by flaring an end portion of the extension outwardly, as shown in Fig. 2. I then provide a fastening device which normally will not readily pass over the shoulder on the extension, but which is adapted to be forced over the shoulder and to be locked behind it automatically, thus clamping the flexible layer against the valve body.

The fastening device preferably embodies a one-piece sheet metal stamping in the form of a ring 20 which has portions thereof such as inwardly spaced fingers 21 and 22 for engaging the flexible material and the shoulder 15 respectively. The fingers in effect constitute teeth having interdental spaces 25, and are so disposed on the ring that alternate teeth press against the flexible material and the shoulder respectively. Additionally, in the preferred arrangement, the shoulder engaging teeth are diametrically opposed to each other.

To provide adequate space into which the flexible material may be crimped, I prefer to bow the fingers 21 upwardly out of the plane of the ring, as shown at 27, and to have the free ends 28 of the fingers terminate adjacent the plane of the ring so as to effect a clamping engagement against the material continuously by the ring 20, and at spaced intervals by the free end portions of the fingers 21.

To maintain a continuous clamping pressure against the flexible material, I prefer to curve the shoulder engaging fingers 22 so as to present a concavo outer surface 30, thus in effect providing a strut which is bowed inwardly toward the extension, when in the final assembled position. Such inclination aids materially in retaining the fastener in clamping position, because in order to release the fastener, it is necessary to pry the shoulder engaging fingers past dead center position before they can be made to clear the shoulder on the extension.

By means of the present invention, a rigid article may be attached to a layer of flexible material through the medium of an extension on the article which passes through an aperture in the flexible material, merely by positioning the ring fastener over the extension and pressing it in a direction axially of the extension until the fingers 22 engage behind the shoulder 15. In practice, this may be accomplished by positioning the rigid article upon the stationary jaw of a press and by striking the fastener with the movable jaw of the press. Thus, in a single operation, the fabric is not only locked against movement with respect to the rigid member, but is likewise sealed against the entrance of gas at the joint. It is to be understood that the fastening device is tempered to impart spring-like characteristics to the fingers, whereby pressure is constantly exerted against the flexible material and shoulder as a result of which an effective clamp and seal is maintained between the two parts to be joined.

I claim:

1. A fastening device having a body portion adapted to extend around a part to be joined, and adapted to bear against another part to be joined, means on the body portion extending downwardly to bear against the last named part at spaced points and fingers extending upwardly and inwardly from the body portion and adapted to bear against the first named part to be joined, said fingers extending upwardly out of the plane of the body, thence inwardly substantially parallel to the plane of the body, and then upwardly presenting a concavo surface, facing upwardly and being adapted at the free ends thereof to engage and clamp against one of the parts to be joined.

2. A sheet metal fastener comprising a ring-like structure having a peripheral portion adapted to bear against one of the parts to be joined and having fingers projecting inwardly therefrom and extending upwardly and thence downwardly, and being adapted to engage adjacent the ends thereof against said part to be joined, said peripheral portion having other fingers extending inwardly thereof and projecting upwardly and adapted to engage the other part to be joined.

3. In combination, a part to be joined comprising a layer of flexible material having an aperture therein, a second part to be joined having an extension projecting through the aperture and having a shoulder on the extension, and a one-piece sheet metal device extending around the extension, said device having a body portion and having fingers projecting inwardly from the body portion but terminating short of each other so as to provide an aperture for receiving said extension, some of said fingers extending downwardly to engage the layer of flexible material and others of said fingers extending upwardly and engaging said shoulder on said extension.

4. In combination, an article to be joined having an aperture therein, a second article to be joined having a portion thereof engaging one side of said first-named article and having a portion thereof projecting through said aperture, there being a shoulder extending outwardly from said portion and continuously around the outer surface thereof, a fastener embodying an annular sheet metal body portion, the body portion having the outer marginal portion thereof adapted to bear against the first named article and having fingers extending inwardly therefrom and terminating short of each other to provide an aperture through which said projecting portion of said second article extends, some of said fingers extending downwardly to engage one of the articles and other of said fingers extending upwardly and engaging behind said shoulder, and operating to clamp the articles together.

5. A fastener having an annular body portion adapted to bear against one part to be joined and to extend around another part to be joined, the body portion having fingers extending inwardly, said fingers being so disposed that alternate fingers form a set extending entirely downwardly and inwardly to engage one part to be joined, and other alternate fingers form a set extending entirely upwardly and inwardly to engage the other part to be joined, the fingers of one set projecting inwardly beyond those of the other set.

6. A fastening device comprising a one-piece sheet metal structure having an annular peripheral portion and radially inwardly extending fingers, the fingers terminating short of the center of the device so as to provide a passageway for receiving the part to be joined, said peripheral portion having an upwardly bowed annular deformation, one set of alternate fingers extending inwardly from said upwardly bowed annular portion, thence upwardly, the last-named upwardly extending portion presenting an upwardly-facing concave surface and another set of fingers extending downwardly from said upwardly bowed annular portion substantially to the under plane of said device.

7. The combination, with a layer of material having an aperture and a member extending through the aperture and provided with an external annular rib, of a fastener having an aperture receiving said member and having an annular body portion bearing against said layer and having a raised annular portion and two sets of spring fingers extending inwardly from said raised portion, the fingers of one set extending downwardly no further than the base of the fastener and pressing against said layer and the fingers of the other set extending upwardly in a concavo-convex form and pressing against said member adjacent said rib.

8. A fastening device composed of thin resilient or spring material comprising an annular body, the outer periphery of which lies in a single plane and when assembled is adapted to bear against the surface of a part to be joined and to have continuous engagement therewith, said peripheral portion having the inner annular part thereof extending upwardly and inwardly, there being fingers projecting inwardly from the raised portion, alternate fingers extending downwardly to engage said part to be joined and the others of said fingers extending upwardly and farther inwardly to engage another part to be joined, the ends of the two sets of fingers lying in two planes parallel with each other.

9. A fastening device comprising a one-piece sheet metal structure having a body portion annular in form, a set of fingers integral with the body portion and extending entirely downwardly and inwardly therefrom and adapted to engage an article upon which the body is adapted to be supported, said body portion having another set of fingers alternating in position with those of the first-mentioned set and extending entirely upwardly and inwardly from said body portion and adapted to engage another part to be joined, said last-named fingers having a concave upper surface and being adapted to effect a clamping action by means of the spring tension therein, both sets of fingers terminating above the base plane of the fastener.

10. In combination, a body of flexible material having a circular aperture therein, an article to be attached thereto having a shouldered head bearing against one face of said flexible material and having a central tubular portion projecting through said aperture in snug engagement with the edge of said aperture, said portion having an outturned flange, and a fastening device embodying a flexible resilient ring which extends around that portion of the article which projects through said aperture and bears against the opposite face of said flexible material from that against which said head bears, said ring being normally of such size that it may not be passed readily over said flange, but having thereon one set of inwardly extending spring fingers adapted to be flexed to engage behind said flange and another set of spring fingers adapted to press said material toward said head.

GEORGE A. TINNERMAN.